United States Patent [19]

Ogawa et al.

[11] Patent Number: 4,638,683
[45] Date of Patent: Jan. 27, 1987

[54] CAMSHAFT FOR ENGINE

[75] Inventors: Yutaka Ogawa; Takayuki Ogasawara; Yoshiaki Hori, all of Nagoya, Japan

[73] Assignee: NGK Insulators, Ltd., Japan

[21] Appl. No.: 742,915

[22] Filed: Jun. 10, 1985

[30] Foreign Application Priority Data

Jun. 18, 1984 [JP] Japan .................. 59-124762

[51] Int. Cl.$^4$ ............................................. F16H 53/00
[52] U.S. Cl. ........................................ 74/567; 74/54
[58] Field of Search ................ 74/567, 54; 123/90.1, 123/90.21; 403/179, 180, 184, 292

[56] References Cited

U.S. PATENT DOCUMENTS

| 2,029,930 | 2/1936 | Martin | 74/567 |
| 2,552,724 | 5/1951 | Lang | 74/567 |
| 3,447,395 | 6/1969 | Latour | 74/567 |

FOREIGN PATENT DOCUMENTS

| 655953 | 1/1938 | Fed. Rep. of Germany . |
| 3232868 | 4/1983 | Fed. Rep. of Germany . |
| 722345 | 3/1932 | France . |
| 548551 | 4/1974 | Switzerland . |
| 2104551 | 3/1983 | United Kingdom . |

Primary Examiner—Henry Bennett
Attorney, Agent, or Firm—Parkhurst & Oliff

[57] ABSTRACT

A camshaft having a plurality of cams disposed on a metal shaft in spaced-apart relation with each other in an axial direction of the shaft, comprising at least one ceramic cam portion which is made of a ceramic material, and which includes at least one of the cams. Each of the at least one ceramic cam portion has a pair of joining protrusions which extend from opposite ends thereof in the axial direction of the metal shaft. The camshaft further comprises metallic shaft portions having joining holes which engage the joining protrusions of the ceramic cam portion such that the ceramic cam portion is joined integrally to the metallic shaft portions.

19 Claims, 7 Drawing Figures

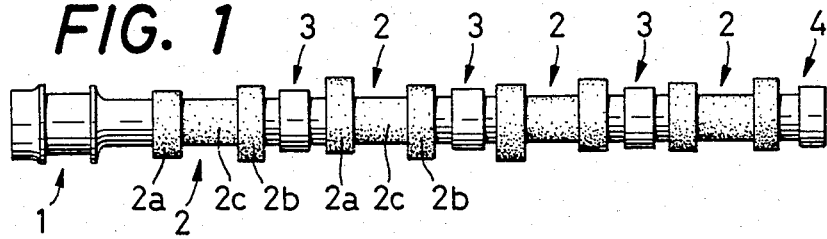
FIG. 1
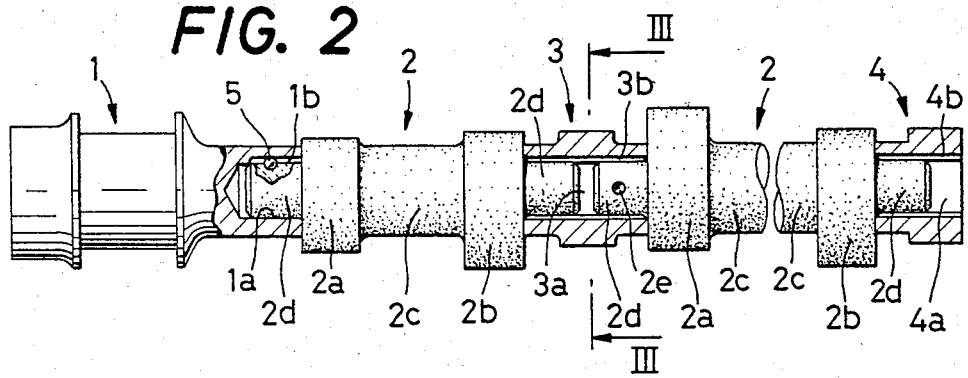
FIG. 2
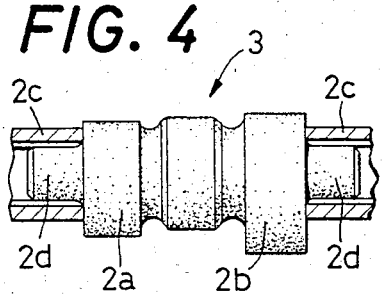
FIG. 4
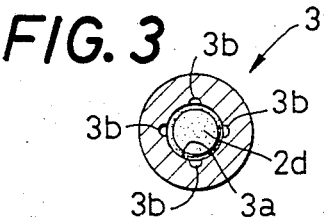
FIG. 3
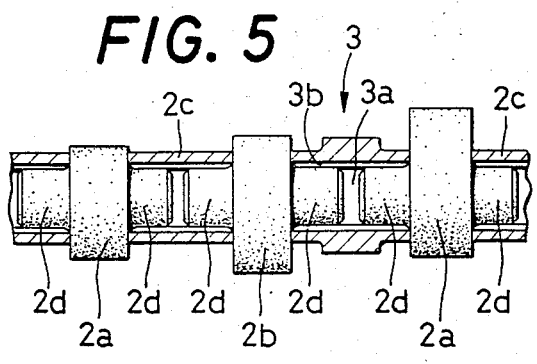
FIG. 5
FIG. 6
FIG. 7

CAMSHAFT FOR ENGINE

BACKGROUND OF THE INVENTION

The present invention relates in general to a camshaft for an engine, and more particularly to a structure of such an engine camshaft using a ceramic material, which is improved in wear resistance and durability and is reduced in weight.

In the valve train of a car engine, wear and abrasion of the components, particularly of cams and rocker arms having sliding surfaces, are a serious problem that should be overcome for improving the durability of the engine. These cams used in the valve train of an engine are conventionally made of cast iron, and their sliding surfaces are chilled or hardened by heat treatment, to increase the wear resistance thereof. Efforts have been made to enhance the durability and reliability of the rocker arms. For example, the sliding surfaces of the rocker arms made of cast iron can be nitrided or coated with a hard-chrome plating layer. Further, sintered alloy tips having an excellent wear resistance are used for the rocker arms which are made of aluminum.

Keeping pace with recent technological progress, engines of automotive vehicles are increasingly required to provide higher performance and capability. On the other hand, there has been a continuing need for controlling emissions from the engine. As a result of meeting the emission control requirements, the lubricating conditions or environments of the engine are aggrevated. Under these circumstances, further improvements are demanded of the cams which are formed as longitudinally spaced-apart integral sections of a camshaft, and of the rocker arms in sliding contact with the camshaft, so as to increase the wear resistance of their sliding surfaces, more specifically, resistance to pitting and scuffing of the sliding surfaces.

To this end, various studies have been made on materials for use as camshafts and rocker arms. Above other things, particular attention of the industry has been paid to a composite camshaft, the cam portions of which are made of a highly wear-resistant material that is different from the material of the shaft portion or portions. In general, it is considered that the cam portions of such a composite camshaft may be made of a ceramic material. However, a ceramic material for the cam portions and a metallic material for the shaft portion or portions have very different properties. Therefore, there arises a problem of how these two different materials are joined or united into an integral assembled composite camshaft.

In the case where metallic cam portions are formed integrally on a metallic shaft portion, the following methods are commonly practiced: Cams of sintered alloy, for example, are set in a casting mold for a camshaft, and a suitable molten metal for the shaft portion is poured into the mold, whereby a composite camshaft with the cam and shaft portions of different metals is obtained. Alternatively, the cams of sintered alloy are formed with bores, and a suitable pipe or shaft of steel or other metal is passed through the bores of the cams, so that the cams are secured to the pipe or shaft by way of a press fit, diffusion joint, welding, brazing, etc. In the case of fabricating a composite camshaft with ceramic cam portions, however, the casing method is difficult to practice because of cracking due to casting stress. Further, the press fit process of forcing a steel pipe or shaft into the bores of the ceramic cams is not desired, since the ceramic cams are subject to tensile stresses, to which ceramic materials inherently exhibit a relatively low resistance. At present, other methods such as diffusion joint, welding and brazing are not practically applicable to ceramic materials. In this connection, it is recognized that the need for a finishing process on the ceramic cam portions of a composite camshaft should be kept to a minimum, because of high hardness nature of a ceramic material, which makes the finishing process difficult.

In manufacturing a camshaft with ceramic cam portions, it is essential to prepare ceramic cam parts and metallic shaft parts with high dimensional accuracy, and join or unite these ceramic and metallic parts with high precision, in a reliable manner.

SUMMARY OF THE INVENTION

It is accordingly an object of the present invention to provide a structure of a camshaft including ceramic cam portions, which has improved wear resistance and significantly reduced weight, and wherein the ceramic cam portions are securely joined or integrally fixed to metallic shaft portions, in a manner that suits the properties of ceramic materials of the cam portions.

According to the invention, there is provided a camshaft having a plurality of cams disposed on a metal shaft in spaced-apart relationship with each other in an axial direction of the metal shaft, comprising: at least one ceramic cam portion which is made of a ceramic material, and which comprises at least one of the plurality of cams, each of the at least one ceramic cam portions having a pair of joining protrusions which extend from opposite ends thereof in the axial direction of the metal shaft; and metallic shaft portions having joining holes which engage the joining protrusions of the ceramic cam portion such that the ceramic cam portion is joined integrally to the metallic shaft portions.

In the camshaft of the present invention constructed as described above, each ceramic cam portion, which has one or more cams formed thereon, is securely united with or fixed to the respective metallic shaft portions to form the integral camshaft, such that the joining protrusions of the cam portion are held in engagement with the corresponding joining holes of the metallic shaft portions. This engagement between the ceramic cam portion and the metallic shaft portions may be achieved by means of press fit (force fit), shrink fit or by other suitable joining means.

According to one form of the invention, each joining protrusion of the ceramic cam portion is provided in the form of a cylinder or a prism having a circular or polygonal shape in transverse cross section perpendicular to the axial direction of the shaft. In this case, the joining holes in the metallic shaft portions have a cross sectional shape substantially identical to that of the joining protrusions. In the case where the male-and-female joint is provided by the joining protrusions in the form of prisms and the corresponding polygonal joining holes, the ceramic cam portion is positioned and locked relative to the metallic shaft portions, in the circumferential direction of the shaft portions.

BRIEF DESCRIPTION OF THE INVENTION

The foregoing and other objects, features and advantages of the invention will be better understood from reading the following detailed description of the preferred embodiments of the invention, in conjunction with the accompanying drawings, in which:

FIG. 1 is a schematic elevational view of one embodiment of an engine camshaft of the present invention;

FIG. 2 is a partially cutaway view partly in cross section of the camshaft of FIG. 1, showing joints between ceramic cam portions and metallic shaft portions;

FIG. 3 is a cross sectional view taken along line III—III of FIG. 2;

FIGS. 4 and 5 are views corresponding to FIG. 2, showing modified embodiments of the invention; and FIGS. 6 and 7 are perspective views illustrating modified forms of joining protrusions formed at opposite ends of each ceramic cam portion.

DETAILED DESCRIPTION OF THE PREFERRED EMBODIMENTS

To further clarify the concept of the present invention, preferred embodiments of the invention will be described in detail, by reference to the accompanying drawings.

Referring first to a schematic elevational view of FIG. 1, there is shown a camshaft of a car engine of the invention, which comprises ceramic cam portions joined to metallic shaft portions as illustrated in partially cutaway, partially cross sectional view of FIG. 2.

In the figures, reference numerals 1, 4 designate end bearing portions, while reference numeral 3 designates intermediate bearing portions. These end and intermediate bearing portions 1, 4, 3 are made of a suitable metallic material, and constitute metallic shaft portions of the camshaft. Ceramic cam portions 2 made of silicon nitride or other ceramic material are interposed between, and integrally joined to, the metallic bearing shaft portions 1, 3, 4, whereby the camshaft is obtained. Described in greater detail, each of the ceramic cam portions 2, which correspond to the number of cylinders of the engine, includes an exhaust valve cam 2a, an intermediate shaft portion 2c, and an intake valve cam 2b, which are formed as integral sections of the cam portion 2. The ceramic cam portion 2 is provided, at its opposite ends, with a pair of joining protrusions 2d, 2d in the form of cylinders which extend from the opposite ends of the ceramic cam portion 2 in opposite directions parallel to the axis of the metallic shaft portions 1, 3, 4. Each of the joining protrusions 2d has a knock-ball recess 2e at a suitable location in the circumferential surface. As described later, this knock-ball recess 2e is used for a knock ball 5 for locking the ceramic cam portion 2 with respect to the metallic shaft portions 1, 3, 4.

Each of the metallic end bearing shaft portions 1 and 4, and the intermediate bearing shaft portions 3 interposed between the adjacent engine cylinders, has a joining hole or holes 1a, 4a, 3a of circular cross sectional shape, which are co-axial with the camshaft, i.e., with the shaft portions. These joining holes 1a, 4a, 3a engage the corresponding joining protrusions 2d, 2d of the ceramic cam portions 2, by means of a press fit (force fit or drive fit), shrink fit, or by other suitable joining means, so that the ceramic cam portions 2 are securely joined to the metallic shaft portions 1, 4, 3. Each of the metallic shaft portions 1, 4, 3 has a plurality of knock-ball grooves 1b, 4b, 3b in the inner surface defining each of the joining holes 1a, 4a, 3a. These knock-ball grooves 1b, 4b, 3b, which cooperate with the knock-ball recess 2e to hold the knock ball 5, are formed in a parallel relationship with the axis of the shaft portions 1, 4, 3, and are equally spaced from each other circumferentially in the joining holes 1a, 4a, 3a.

In this specific embodiment of the camshaft for a four-cylinder engine, four knock-ball grooves 3b are formed in the inner surface of the joining hole 3a of each intermediate shaft portion 3, for example, such that the grooves 3b are evenly spaced circumferentially in the joining hole 3a, as indicated in FIG. 3. The knock ball 5 is held in engagement with the knock-ball recess 2e of the appropriate ceramic cam portion 2, and with a selected one of the four knock-ball grooves 3b, so that the ceramic cam portion 2 may be locked in one of four circumferential positions relative to the intermediate shaft portion 3, when the ceramic cam portion 2 and shaft portion 3 are joined together. The ceramic cam portions 2, each of which has the integral exhaust and intake valve cams (2a, 2b) for each engine cylinder, are securely joined to the adjacent metallic end and/or intermediate bearing shaft portions 1, 4, 3, by a press fit, shrink fit or other type of joint at the joining protrusions 2d, 2d extending from the opposite axial ends of the ceramic cam portions 2, and the corresponding joining holes 1a, 4a, 3a formed in the metallic shaft portions 1, 4, 3. In this manner, the ceramic cam portions 2 and the metallic shaft portions 1, 4, 3 are manufactured as an integral camshaft having four sets of cams (2a, 2b). In the process of joining the ceramic cam portions 2 and the metallic shaft portions 1, 4, 3, the predetermined circumferential positions of the cam portions 2 relative to the shaft portions 1, 4, 3 are determined and maintained by means of the knock balls 5 which are held in engagement with the knock-ball recesses 2e formed in the circumferential surface of the joining protrusions 2d, 2d of the ceramic cam portions 2, and with the appropriate knock-ball grooves 1b, 4b, 3b formed in the inner surface of the joining holes 1a, 4a, 3a of the metallic shaft portions 1, 4, 3.

While, in the instant embodiment, each ceramic cam portion 2 for each engine cylinder includes the intermediate shaft portion 2c connecting the intake and exhaust valve cams 2b, 2a, it is possible that the intermediate shaft portion 2c of the ceramic cam portion 2 be replaced with a bearing portion (3), while the metallic bearing shaft portions 3 are replaced by metallic intermediate shaft portions (2c), as indicated in FIG. 4. Namely, the ceramic cam portion of FIG. 4 includes the exhaust and intake valve cams 2b and 2a and the intermediate bearing portion (3). In this case, the ceramic cam portions are connected by the metallic intermediate shaft portions (2c) which are disposed between the adjacent engine cylinders. Further, it is possible that each of the exhaust and intake valve cams 2a, 2b be provided on a single ceramic cam portion, as depicted in FIG. 5. In this instance, each ceramic cam portion has a pair of joining protrusions 2d, 2d which are securely fixed in respective joining holes formed in the metallic intermediate shaft portions 2c and in the metallic bearing shaft portions 1, 4, 3. (It is possible that one cam may serve as exhaust and intake valve cams.)

While the knock balls 5 are used in the foregoing embodiments to position and lock the ceramic cam portions 2 and the metallic shaft portions (1, 4, 3) circumferentially, with respect to each other, similar arrangements may be employed for camshafts for engines having more than four cylinders, by increasing the number of the knock-ball grooves. For instance, each of the joining holes 3a of the intermediate shaft portions 3 of a camshaft for a six-cylinder engine, is provided with six knock-ball grooves 3b which are equally spaced from each other circumferentially in the joining hole 3a.

The positioning and locking of the cam portions and the shaft portions may be achieved by other means as shown in FIGS. 6 and 7. Stated more specifically, the joining protrusions 2d, 2d provided on opposite axial ends of each ceramic cam portion 2 are formed as a square prism as illustrated in FIG. 5, or as a regular or equilateral hexagonal prism as illustrated in FIG. 7. The square prism protrusions 2d, 2d are used for a camshaft for a four-cylinder engine, and the regular hexagonal prism protrusions 2d, 2d are used for a camshaft for a six-cylinder engine.

In the case where the joining protrusions 2d, 2d take the form of prisms of regular polygonal transverse cross sectional shape, the corresponding joining holes 1a, 4a, 3a in the metallic end or intermediate bearing shaft portions 1, 4, 3 are formed so as to have a polygonal transverse cross sectional shape substantially identical to that of the joining prisms 2d, 2d. When this type of polygonal prism and hole arrangement is adopted, the ceramic cam portions and the metallic shaft portions may be circumferentially positioned and locked without the aforementioned knock balls 5, knock-ball recesses 2e and knock-ball grooves 1b, 4b, 3b.

From the standpoint of manufacture and assembly of the prisms 2d, 2d, it is preferred that the cross sectional shape of the prisms be a regular or equilateral polygon. However, it is possible to form the prisms 2d, 2d of an irregular polygonal cross sectional shape.

Each ceramic cam portion 2, which has the single valve cam 2a or 2d as shown in FIG. 5, or the set of exhaust and intake valve cams 2a and 2b as shown in FIGS. 2 and 4, is generally made of silicon nitride, silicon carbide, zirconia, alumina or other suitable ceramics, which are selected depending upon the specific applications of the camshaft to be produced.

While the present invention has been described in its preferred embodiments, it should be understood that various changes, modifications and improvements may occur to those skilled in the art, in the light of foregoing teachings, without departing from the spirit of the invention.

As discussed hitherto, the camshaft having ceramic cam portions according to the invention are provided with cams made of a ceramic material, i.e., ceramic sliding cam surfaces which are highly resistant to wear. In addition, the use of a ceramic material for the cam portions is conducive in a considerable degree to reduction in weight of the camshaft, therefore contributing to the fulfilment of the increasing need of weight reduction of the engine assembly. For example, when a camshaft for a four-cylinder 2-liter engine is manufactured with ceramic cam portions of silicon nitride according to the invention, the weight of the camshaft is reduced by about 40% (0.85 kg), as compared with the weight of its conventional counterpart.

As described previously, a set of exhaust and intake valve cams are provided by a ceramic cam unit which consists of one or two ceramic cam portions. Each ceramic cam unit corresponds to a cylinder in an engine. Therefore, by using a corresponding number of ceramic cam units in combination with a suitable number of metallic shaft portion units, camshafts for different engines with a varying number of cylinders may be easily produced with relatively reduced costs, as compared with conventional camshafts which are designed and constructed differently from each other, depending upon the number of cylinders of the engines.

The camshaft of the invention offers various other advantages which accrue from the foregoing arrangement in which different camshafts are constituted by joining basic common units, namely, ceramic cam units for the ceramic cam portions, and metallic units for the end and intermediate bearing shaft portions. For example, the process of finishing the assembled camshafts may be minimized by preparing the basic common units with sufficiently high dimensional accuracy.

What is claimed is:

1. A camshaft having a plurality of cams disposed on a metal shaft in a spaced-apart relationship with each other in an axial direction on the shaft, wherein the improvement comprises:
   at least one ceramic cam portion comprising a ceramic material, each of said at least one ceramic cam portion having a pair of joining protrusions which extend from opposite axial ends thereof in said axial direction of the metal shaft; and
   a plurality of metallic shaft portions separated from each other by said at least one ceramic cam portion, each of said metallic shaft portions including joining holes which engage said joining protrusions of said at least one ceramic cam portion, such that said at least one ceramic cam portion is joined integrally to said metallic shaft portions.

2. A camshaft as claimed in claim 1, wherein said joining protrusions comprise cylinders having a circular shape in transverse cross section perpendicular to said axial direction, and said joining holes have a transverse cross sectional shape substantially identical to that of said joining protrusions.

3. A camshaft as claimed in claim 1, wherein said joining protrusions comprise prisms having a polygonal shape in transverse cross section perpendicular to said axial direction, and said joining holes have a transverse cross sectional shape substantially identical to that of said joining protrusions.

4. A camshaft as claimed in claim 1, wherein said joining protrusions are press-fitted into said joining holes.

5. A camshaft as claimed in claim 1, wherein said joining protrusions are shrink-fitted into said joining holes.

6. A camshaft as claimed in claim 1, wherein each of said at least one ceramic cam portions comprises a single cam.

7. A camshaft as claimed in claim 1, wherein each of said at least one ceramic cam portions comprises a plurality of cams.

8. A camshaft as claimed in claim 1, wherein said joining holes includes a plurality of knock-ball recesses.

9. A camshaft as claimed in claim 8, wherein the knock-ball recesses are circumferentially equidistant within said joining holes.

10. A camshaft as claimed in claim 9, wherein said joining protrusions include knock balls which communicate with said knock-ball grooves in said joining holes.

11. A camshaft for an engine comprising:
    a plurality of cam surfaces, at least one of said cam surfaces comprising a ceramic material, each of said at least one ceramic cam portions including a pair of joining protrusions, each joining protrusion axially extending from opposite ends of said ceramic cam portion and having at least one knock ball thereon;

a plurality of metallic shaft portions including joining holes which engage said axial joining protrusions of said at least one ceramic cam portion, said joining holes including a plurality of knock-ball recesses therein, said plurality of metallic shaft portions being axially separated from each other by said at least one ceramic cam portion, such that each of said at least one ceramic cam portions is joined integrally to at least two metallic shaft portions.

12. A camshaft as claimed in claim 11, wherein said joining protrusions comprise cylinders having a circular shape in transverse cross section perpendicular to said axial direction, and said joining holes have a transverse cross sectional shape substantially identical to that of said joining protrusion.

13. A camshaft as claimed in claim 11, wherein said joining protrusions comprise prisms having a polygonal shape in transverse cross section perpendicular to said axial direction, and said joining holes have a transverse cross sectional shape substantially identical to that of said joining protrusions.

14. A camshaft as claimed in claim 11, wherein said joining protrusions are press-fitted into said joiing holes.

15. A camshaft as claimed in claim 11, wherein said joining protrusions are shrink-fitted into said joining holes.

16. A camshaft as claimed in claim 1, wherein each of said at least one ceramic cam portions comprises a single cam.

17. A camshaft as claimed in claim 1, wherein each of said at least one ceramic cam portions comprises a plurality of cams.

18. A camshaft as claimed in claim 11, wherein the knock-ball recesses are circumferentially equidistant within said joining holes.

19. A camshaft as claimed in claim 18, wherein said knock balls communicate with said knock-ball grooves in said joining holes.

* * * * *